(12) United States Patent
Shen et al.

(10) Patent No.: US 8,059,735 B2
(45) Date of Patent: *Nov. 15, 2011

(54) ALLOCATION OF BLOCK SPREADING SEQUENCES

(75) Inventors: Zukang Shen, Richardson, TX (US); Tarik Muharemovic, Dallas, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 836 days.

This patent is subject to a terminal disclaimer.

(21) Appl. No.: 12/129,378

(22) Filed: May 29, 2008

(65) Prior Publication Data

US 2008/0298488 A1    Dec. 4, 2008

Related U.S. Application Data

(60) Provisional application No. 60/941,883, filed on Jun. 4, 2007, provisional application No. 60/944,948, filed on Jun. 19, 2007.

(51) Int. Cl.
    *H04L 27/28* (2006.01)
(52) U.S. Cl. ...................................... 375/260
(58) Field of Classification Search .................. 375/260, 375/130, 347, 349; 370/280, 329; 455/450, 455/550, 550.1
    See application file for complete search history.

(56) References Cited

U.S. PATENT DOCUMENTS

| 2007/0171995 A1* | 7/2007 | Muharemovic et al. ...... 375/260 |
| 2009/0175159 A1* | 7/2009 | Bertrand et al. .............. 370/203 |

OTHER PUBLICATIONS

"Enhanced Radio Access Technologies for Next Generation Mobile Communication", M. Sawahashi, et al., Springer Netherlands, May 1, 2007, pp. 217-276 (see pp. 254-257).
"On the Effects of User Mobility on the Uplink of an OFDMA System", D. Galda, et al., The 57th IEEE Semiannual Vehicular TEchnology Conference, Apr. 22-25, 2003, pp. 1433-1437 (see pp. 1434-1437).
"Space Time-Coded CDMA Uplink Transmission with MUI-free Recception", K.C.B. Wavegedara, et al., IEEE Transactions on Wireless Communications, vol. 4, No. 6, Jan. 2005, pp. 3095-3105 (See the abstract).
"The Long Term Evolution Towards a New 3GPP Air Interface Standard", R. Bachl, et al., Bell Labs Technical Journal, vol. 11, Issue 4, Mar. 9, 2007, pp. 25-51 (see pp. 34-35).
Texas Instruments, "Increasing the Number of Orthogonal Signals Using Block Spreading", U.S. Appl. No. 11/627,035, filed Jan. 25, 2007.
Texas Instruments, "Coherent Uplink ACK/NAK Transmission with High Speed UEs", 3GPP TSG RAN WG1 #49, R1-072857, Agenda Item: 5.13.2, Orlando, Florida, Jun. 25-29, 2007, pp. 1-6.

* cited by examiner

*Primary Examiner* — Khai Tran
(74) *Attorney, Agent, or Firm* — Ronald O. Neerings; Wade James Brady, III; Frederick J. Telecky, Jr.

(57) ABSTRACT

A transmission of information from a secondary to a primary node occurs in a plurality of N logical time durations. The transmission from the secondary to primary node in a wireless network is obtained using a first and a second sequence. Embodiments of the present invention mitigate interference by restricting the choice of the first sequence. Thus, in an embodiment of the invention, the first sequence is selected from a set of M sequences wherein M is strictly less than N. In order to accommodate high-velocity users, the restricted set contains a pair of sequences whose element-wise product is mirror symmetric. A transmission component for K-th logical time duration is obtained from the entire second sequence and K-th element of the first sequence.

60 Claims, 10 Drawing Sheets

US 8,059,735 B2

ALLOCATION OF BLOCK SPREADING SEQUENCES

CLAIM OF PRIORITY UNDER 35 U.S.C. 119(e)

The present application claims priority to and incorporates by reference U.S. Provisional Application No. 60/941,883, filed Jun. 4, 2007, entitled "Block Spreading Sequences Allocation for High Speed Users." The present application also claims priority to and incorporates by reference U.S. Provisional Application No. 60/944,948 filed Jun. 19, 2007, entitled "Coherent Uplinks ACK/NAK Transmission With High Speed UEs."

FIELD OF THE INVENTION

This invention generally relates to wireless cellular communication, and in particular to use of block spreading codes in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
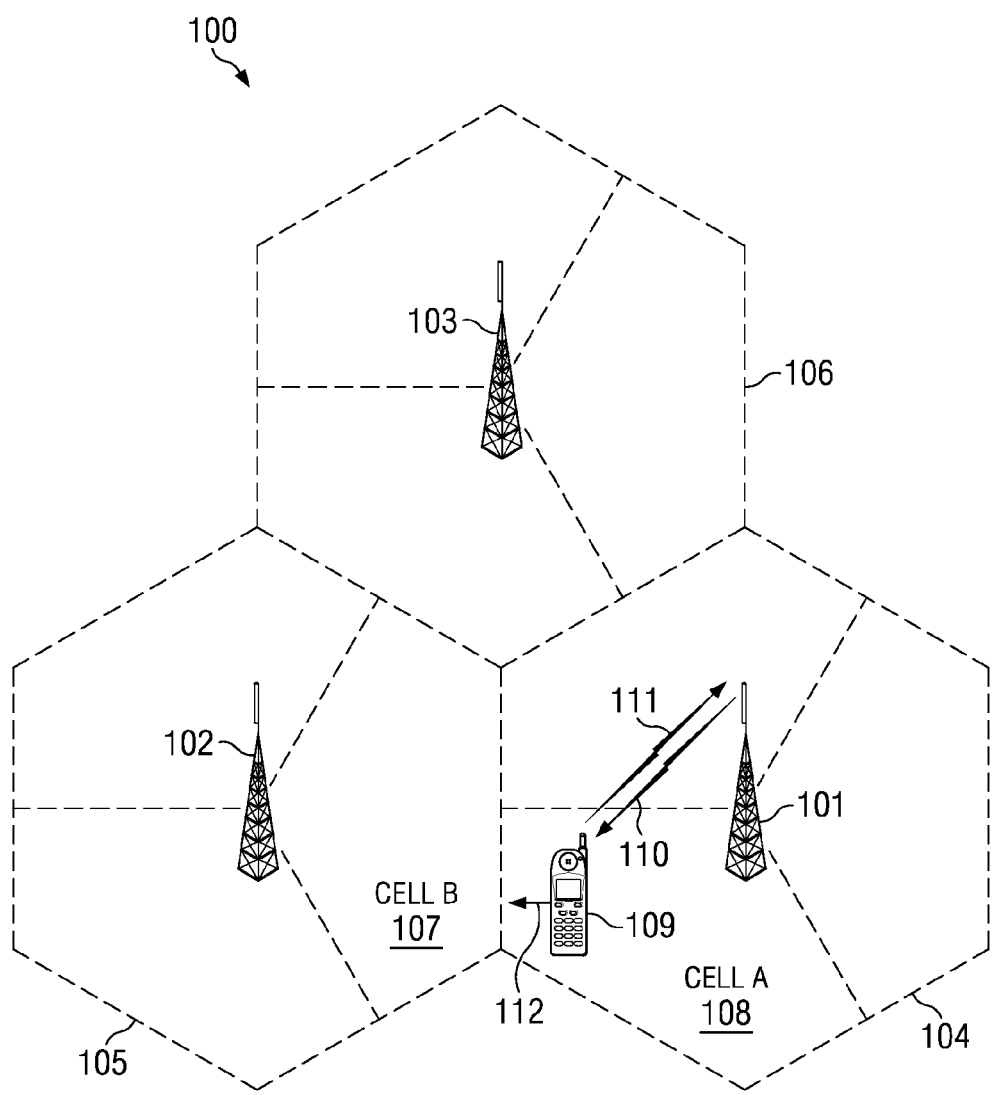
FIG. 1 is a pictorial of an illustrative telecommunications network that employs block spreading sequence allocation for high speed users.

A transmission of information from a secondary to a primary node occurs in a plurality of logical time durations. The transmission from the secondary to primary node in a wireless network is obtained using a first and a second sequence. First sequence is of length N and can also be referred to as "orthogonal covering," or alternatively, "block spreading," or any other equivalent term. In prior art, the first sequence is selected from a set of N possible orthogonal sequences. Embodiments of the present invention mitigate interference by restricting the choice of the first sequence. Thus, in an embodiment of the invention, the first sequence is selected from a set of M sequences wherein M is strictly less than N. In order to accommodate high-velocity users, the restricted set contains a pair of sequences whose element-wise product is mirror symmetric. The transmission component for K-th logical time duration is obtained from the entire second sequence and K-th element of the first sequence. In embodiments of the invention, K-th element of the first sequence multiplies the entire second sequence. In embodiments on the invention, both first and second sequence are implicitly communicated to the secondary node, and then used to generate the transmission signal. In embodiments of the invention, the transmission signal is also modulated by elements of the uplink control information (UCI). Elements of UCI are selected from the set comprising of: ACKNAK information, scheduling request indicator (SRI), and rank indicator (RI). Embodiments of the invention are applied to OFDM-based modulation. In some embodiments, sequences in the restricted set are ranked according to amount of interference which they cause. Sequence which causes the least amount of interference is allocated to the secondary node with highest estimated velocity.

Orthogonal block spreading codes can be applied to multiple users for simultaneous transmission within the same frequency-time resource. In case the user is traveling at a high velocity, its channel varies within the time period when block spreading is applied. Consequently, orthogonality between multiple users' signal is lost, resulting in inter-user interference which degrades the signal detection performance. On the other side, the high speed user's channel typically evolves in a linear (or close to linear) fashion within the block spreading time period. For any set of orthogonal block spreading codes, there could be one or a few codes which can be assigned to high speed users, without causing significant inter-user interference. A method to assign block spreading codes to users based on their velocities is described herein, such that inter-user interference is minimized. More importantly, it is critical to identify a restricted subset of all available block spreading codes such that each block spreading code in the restricted subset generates little interference and therefore can be randomly or implicitly assigned to UE of any velocity. Consequently, the signaling overhead of indicating block spreading code to UE can be reduced.

In this disclosure, block spreading code is sometimes denoted as orthogonal sequences, orthogonal covering, or any other equivalent term. The restricted subset is sometimes denoted as restrict set.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

A UE in a cell may be stationary such as within a home or office, or may be moving while walking or riding in a vehicle. UE 109 moves within cell 108 with a velocity 112 relative to base station 102. A method to assign block spreading codes to UE based on their velocities to reduce inter-user interference for signaling on uplink 111 is described in more detail below. Velocity 112 can be determined using Doppler shift techniques, for example.

Figure 2A:
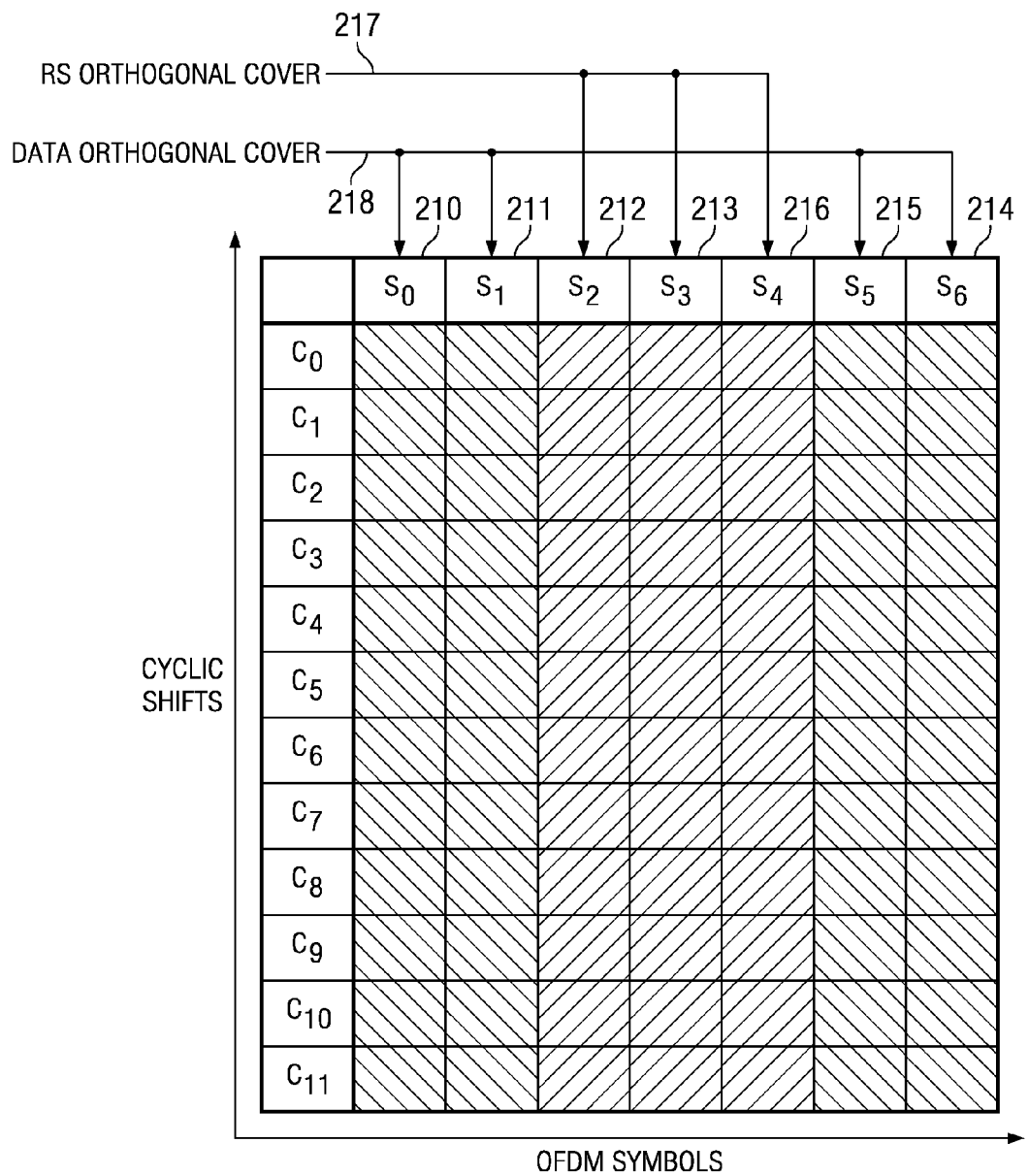
FIGS. 2A and 2B illustrate coherent orthogonal structures that support transmission by multiple users within the same frequency and time resource.
Figure 2B:
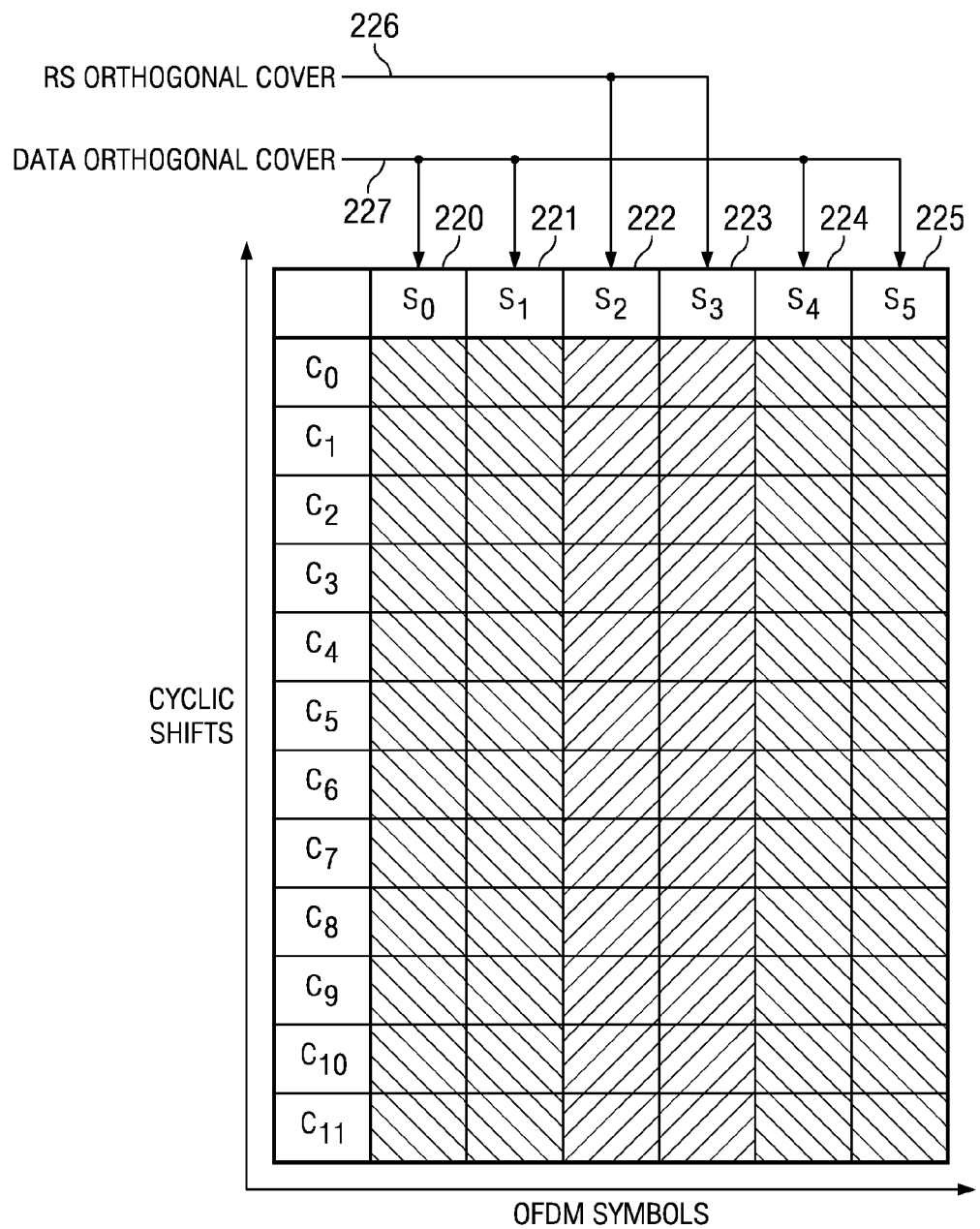

FIGS. 2A and 2B illustrate coherent orthogonal structures that support transmission by multiple users within the same frequency and time resource. A similar structure is specified in E-UTRA specifications for standalone ACK/NACK or SRI transmission on PUCCH. FIG. 2A illustrates one slot of a transmission frame in which normal cyclic prefix (CP) are used, where $c_0$-$c_{11}$ represent the cyclic shifts of a CAZAC-like sequence, and $s_0$-$s_6$ represent seven OFDM symbols per slot (0.5 ms). Without loss of generality, the middle three OFDM symbols 212-214 are assumed to carry the reference signal (RS) for coherence demodulation, while the other four OFDM symbols 210, 211, 215 and 216 carry the data information. Orthogonal covering 217 and 218 is applied to the RS OFDM symbols and the data bearing OFDM symbols, respectively. The data bearing OFDM symbols can be binary phase shift keying (BPSK) modulated, quadrature phase shift keying (QPSK) modulated, or ON-OFF keying modulated.

Similarly, FIG. 2B illustrates one slot of a transmission frame in which extended cyclic prefix (CP) are used and therefore only six symbols 220-225 are available per slot (0.5 ms). The middle two OFDM symbols 222-223 are assumed to carry the reference signal (RS) for coherence demodulation, while the other four OFDM symbols 220, 221, 224 and 225 carry the data information. Orthogonal covering 226 and 227 is applied to the RS OFDM symbols and the data bearing OFDM symbols, respectively. The data bearing OFDM symbols are BPSK modulated, QPSK modulated, or ON-OFF keying modulated.

In each OFDM symbol, a cyclically shifted or phase ramped CAZAC-like sequence is transmitted. The CAZAC-like sequence in a RS OFDM symbol is un-modulated. The CAZAC-like sequence in a data OFDM symbol is modulated by the data symbol. Here the data symbol can be the ACK/NAK symbol, SRI symbol, Rank Indicator (RI) symbol, or CQI symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff—Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, 0 \leq n \leq M_{sc}^{RS}-1$$

where $M_{sc}^{RS}=12$ and $\phi(n)$ is defined in Table 1.

In this disclosure, the cyclically shifted or phase ramped CAZAC-like sequence is sometimes denoted as cyclic shifted base sequence. In other places, the CAZAC-like sequence is generally referred to as the second sequence, while the block spreading code is generally referred to as the first sequence.

TABLE 1

Definition of $\phi(n)$

| u | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | −1 | 1 | −1 | −3 | −1 | 3 | 1 | 3 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

Block Spreading Codes

Figure 3:
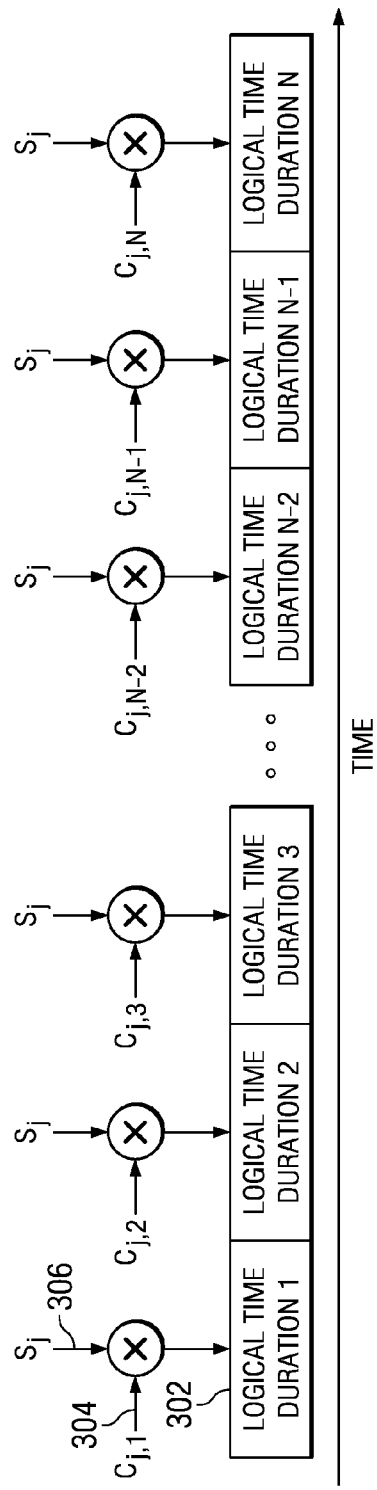
FIG. 3 is a diagram illustrating application of a block spreading code over a time frame.

In this disclosure, it is assumed that a block spreading code of length N is applied to N time slots. The N time slots can be consecutive or non-consecutive in time. For illustration simplicity, it is assumed the N time slots are consecutive in time in this disclosure. The disclosed method can be easily extended to the case where the N time slots are non-consecutive in time. Further, each of the time slots consists of one or multiple signal samples. FIG. 3 shows an example of a block spreading system over N time durations 302. $[c_{j,1}, c_{j,2}, \ldots, c_{j,N}]$ is the jth block spreading code, indicated in general as 304, which spreads the signal $S_j$, indicated in general as 306. If $S_j$ contains multiple signal samples, each signal sample is multiplied by block spreading symbol $c_{j,n}$ in the nth time duration, where $1 \leq n \leq N$.

Consider M ($1 \leq M \leq N$) mutually orthogonal block spreading codes and M users. Let $V_j$ denote the velocity of user j. Without loss of generality, assume $V_1 \leq V_2 \leq \ldots \leq V_M$. In one embodiment of the present invention, a 1-to-1 mapping is performed between the M block spreading codes and M users, based on the user velocities.

Figure 4:
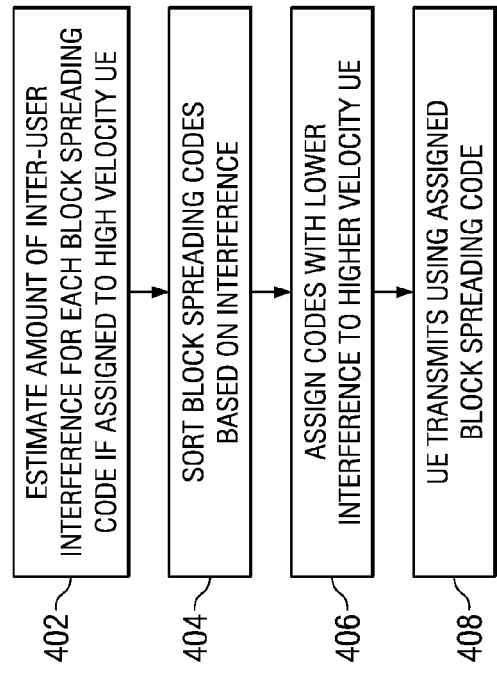
FIG. 4 is a flow diagram illustrating selection of block spreading codes according to an embodiment of the present invention.

FIG. 4 is a flow diagram illustrating selection of block spreading codes according to an embodiment of the present invention. Each block spreading code is evaluated 402 to estimate the amount of inter-user interference it can cause if assigned to a high velocity user. A metric I is derived for each block spreading code. This metric indicates how suitable a block spreading code is for high speed users. Without loss of generality, in this disclosure, it is assumed the smaller I is, the better the block spreading is suitable for high speed users.

The metric I of all available block spreading codes is sorted 404 in a descending order.

The jth ordered block spreading code is then assigned 406 to the jth user, assuming $V_1 \leq V_2 \leq \ldots \leq V_M$. In this manner, a higher velocity UE is assigned a block spreading code having lower inter-user interference.

In another embodiment, a restricted subset of block spreading codes having lower inter-user interference is selected from the set of block spread codes. A block spreading code is assigned to a high speed UE randomly or implicitly by using one of the block spreading codes in the restricted subset of block spreading codes. The set of block spreading codes may be selected depending on the number of high velocity UEs in the cell. The block spreading codes in the selected subset of block spreading codes may be randomly or implicitly assigned to UEs multiplexed in the same frequency-time resource for the transmission ACK/NAK and SRI, as will be described in more detail below. In another embodiment, a default subset of block spreading codes is always used in a cell.

Each UE then transmits 408 using the assigned block spreading code. The eNB may inform its serving UEs the selected subset of block spreading codes via broadcast channels or higher layer signaling. The eNB may inform each high velocity UE its assigned block spreading code via downlink control channel or higher layer signaling.

In one embodiment, metric I is estimated using a vector W, which is a function of the N time slots in which block spreading is applied. Let W be a vector of length N and $w_n$ denote the nth element in W. If the N time slots are consecutive, then, $$w_n = -(N+1)/2 + n \text{ if } N \text{ is odd}$$

$$w_n = -N - 1 + 2n \text{ if } N \text{ is even} \quad (1)$$

where $1 \leq n \leq N$. For example, if N=5, W=[−2 −1 0 1 2]; if N=6, W=[−5 −3 −1 1 3 5].

With W defined as in equation (1), for each block spreading code $C_j = [c_{j,1}, c_{j,2}, \ldots, c_{j,N}]$, calculate the following metric $$I_j = \max_{1 \leq i \leq M, i \neq j} \left| \sum_{n=1}^{N} c_{i,n}^* c_{j,n} w_n \right| \quad (2)$$

With $I_j$ defined as in equation (2), the block spreading code can be ordered such that $I_1 \geq I_2 \geq \ldots \geq I_M$. Then, the jth ordered block spreading code can be assigned to user j assuming $V_1 \leq V_2 \leq \ldots \leq V_M$.

Notice that alternative definitions for I are possible, for example, $$I_j = \sum_{i=1, i \neq j}^{M} \left| \sum_{n=1}^{N} c_{i,n}^* c_{j,n} w_n \right| \quad (3)$$

In this embodiment, equation (2) is adopted as the definition for $I_j$. Other embodiments may adopt equation (3) as the definition for $I_j$. Still other embodiments may adopt variations of these equations or alternative equations as the definition for $I_j$.

Four examples will now be described that illustrate how to assign block spreading codes to users according their velocities. These four examples are illustrative and other examples may be easily constructed according to the teachings herein.

Example 1

Assuming three mutually orthogonal block spreading codes of length four, i.e.
$C_1=[1\ 1\ 1\ 1]$
$C_2=[1\ -1\ 1\ -1]$
$C_3=[1\ -1\ -1\ 1]$
With $I_j$ defined in equation (2), and $w=[-3\ -1\ 1\ 3]$, the interference metrics are: $I_1=4$, $I_2=8$, and $I_3=8$. Thus, $C_1$ should be assigned to the user at the highest velocity. Since $I_2=I_3$, $C_2$ and $C_3$ can be assigned randomly to either of the other two users.

Example 2

Assuming three mutually orthogonal block spreading codes of length four, i.e.
$C_1=[1\ 1\ 1\ 1]$
$C_2=[1\ 1\ -1\ -1]$
$C_3=[1\ -1\ -1\ 1]$
With $I_j$ defined in equation (2), and $w=[-3\ -1\ 1\ 3]$, the interference metrics are: $I_1=8$, $I_2=8$, and $I_3=4$. Thus, $C_3$ should be assigned to the user at the highest velocity. Since $I_1=I_2$, $C_1$ and $C_2$ can be assigned randomly to either of the other two users.

Example 3

Assuming three mutually orthogonal block spreading codes of length four, i.e.
$C_1=[1\ 1\ -1\ -1]$
$C_2=[1\ -1\ 1\ -1]$
$C_3=[1\ -1\ -1\ 1]$
With $I_j$ defined in equation (2), and $w=[-3\ -1\ 1\ 3]$, the interference metrics are: $I_1=4$, $I_2=8$, and $I_3=8$. Thus, $C_1$ should be assigned to the user at the highest velocity. Since $I_2=I_3$, $C_2$ and $C_3$ can be assigned randomly to either of the other two users.

Example 4

Assuming three mutually orthogonal block spreading codes of length four, i.e.
$C_1=[1\ 1\ 1\ 1]$
$C_2=[1\ 1\ -1\ -1]$
$C_3=[1\ -1\ 1\ -1]$
With $I_j$ defined in equation (2), and $w=[-3\ -1\ 1\ 3]$, the interference metrics are: $I_1=8$, $I_2=8$, and $I_3=4$. Thus, $C_3$ should be assigned to the user at the highest velocity. Since $I_1=I_2$, $C_1$ and $C_2$ can be assigned randomly to either of the other two users.

Note that if the definition of $I_j$ in equation (3) is used, there may be a different 1-to-1 mapping of block spreading codes to user velocities in Examples 1-4.

Another embodiment is to choose M ($M \leq N$) most suitable codes out of the N available block spreading codes for high velocity users. Let $X_p$ denote the pth set of M spreading codes, then calculate $$XI_p = \max_{j \in S_p} I_j \qquad (4)$$

where $I_j$ is defined in equation (2). Then, the best set of M spreading codes is defined as $$X_p^{opt} = \arg\min_p XI_p \qquad (5)$$

Example 5

In this example, let N=4 and the four available spreading codes are
$C_1=[1\ 1\ 1\ 1]$
$C_2=[1\ 1\ -1\ -1]$
$C_3=[1\ -1\ 1\ -1]$
$C_4=[1\ -1\ -1\ 1]$
The goal is to select two out of four spreading codes. Six possible sets exist, i.e. $X_1=\{C_1, C_2\}$, $X_2=\{C_1, C_3\}$, $X_3=\{C_1, C_4\}$, $X_4=\{C_2, C_3\}$, $X_5=\{C_2, C_4\}$, and $X_6=\{C_3, C_4\}$. With $w=[-3\ -1\ 1\ 3]$, it can be obtained that $XI_1=XI_6=8$, $XI_2=XI_5=4$, $XI_3=XI_4=0$. Thus, either the set of $\{C_1, C_4\}$ or $\{C_2, C_3\}$ can be chosen to provide minimum inter-user interference.

A commonality of the above examples is that a restricted subset of orthogonal sequences is selected. In addition, element-wise produce of at least a pair of orthogonal sequences in the restricted subset is mirror symmetric. For example, in the restricted subset of orthogonal sequences of $\{[1\ 1\ 1\ 1], [1\ 1\ -1\ -1], [1\ -1\ -1\ 1]\}$, the element-wise produce of $[1\ 1\ 1\ 1]$ and $[1\ -1\ -1\ 1]$ is $[1\ -1\ -1\ 1]$, which is mirror symmetric. Another example of restricted subset is $\{[1\ 1\ -1\ -1], [1\ -1\ 1\ -1]\}$, with the element-wise product of the two orthogonal sequences as $[1\ -1\ -1\ 1]$, which is also mirror symmetric.

The property of mirror symmetry of the element-wise product of two orthogonal sequences are essential for reducing interference in high speed scenario, as the channel variation is linear or quasi-linear over the time duration where block spreading is applied.

Uplink ACK/NAK Structures

Figure 5:
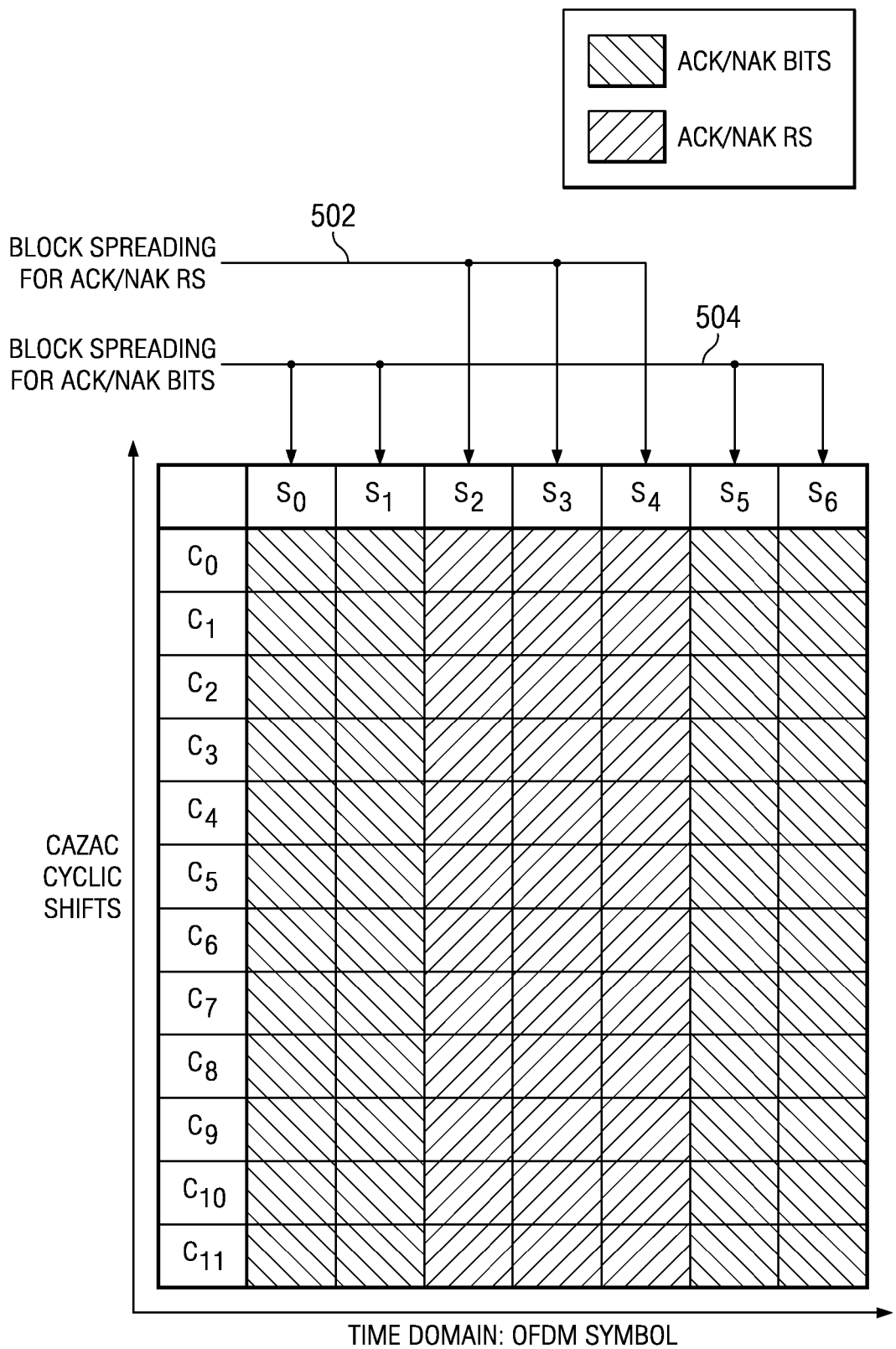
FIG. 5 is an illustration of transmission of ACK/NAK symbols using the orthogonal structure of FIG. 2A.

Coherent transmission with three RS OFDM symbols per slot may be used for uplink ACK/NAK transmission corresponding to scheduled downlink data service in one embodiment. In other embodiments, fewer or more RS symbols by be used. FIG. 5 shows a block diagram illustrating a coherent ACK/NAK transmission scheme per slot, where CS0-CS11 represent 12 cyclic shifts per resource block (RB) and S0-S6 denote seven OFDM symbols per slot. Although the exact RS symbol positions may vary from one embodiment to another, without loss of generality, an illustrative example can assume RS is transmitted in the 3rd, 4th, and 5th OFDM symbols, S2, S3 and S4. Moreover, without loss of generality, in the following discussion, we assume effectively 6 cyclic shifts are used. The unused cyclic shift may serve as guard to provide protection from signal spillovers between neighboring cyclic shifts. Note the guard cyclic shifts may be different for different orthogonal sequences.

To increase the ACK/NAK multiplexing capacity, block spreading is applied to the RS OFDM symbols and ACK/NAK bearing OFDM symbols, respectively. For example, the RS OFDM symbols are covered by block spreading codes 502 of length three, while the ACK/NAK bearing OFDM symbols are covered with block spreading codes 504 of length four. Thus, the maximum number of simultaneous ACK/NAK UEs per slot is 18 in FIG. 5. However, orthogonality between block spreading codes is lost with high speed UEs, which, coupled with imperfect uplink power control, could significantly impact the UL ACK/NAK detection performance.

ACK/NAK Inter-User Interference with Block Spreading

With the coherent ACK/NAK transmission scheme outlined in the previous section, 18 UEs can be multiplexed in one slot. If all UEs are of low speed, then inter-user interference is minimal. On the other hand, if one or more UEs are of high speed, orthogonality between block spreading codes is lost. However, in an embodiment of LTE UL numerology, even for UEs at 350 km/h, the channel variation within one slot can be well approximated linearly. Thus, for a high speed UE, its channel on the seven OFDM symbols within one slot can be effectively modeled as [h−3Δ, h−2Δ, h−Δ, h, h+Δ, h+2Δ, h+3Δ], where h denotes the channel in the middle (4th) OFDM symbol and Δ is channel variation between two consecutive OFDM symbols, which clearly depends on the UE speed.

Let $c_i(n)$ and $c_j(n)$ (n=1, 2, 3, 4) denote two block spreading codes of length 4, assigned to UE i and UE j, respectively, for their ACK/NAK bearing OFDM symbols. Assuming UE j is of high speed, whose channel on the ACK/NAK bearing OFDM symbols can be modeled as h(n)=[h−3Δ, h−2Δ, h+2Δ, h+3Δ], the inter-user inference caused by UE j to UE i, denoted as $I_{j \to i}$, is $$I_{j \to i} = \left| \sum_{n=1}^{4} c_i^*(n) c_j(n) h(n) \right| = \left| \sum_{n=1}^{4} c_i^*(n) c_j(n) w(n) \Delta \right|,$$

where w(n)=[−3 −2 2 3]. Further, denote $$\bar{I}_{j \to i} = \left| \sum_{n=1}^{4} c_i^*(n) c_j(n) w(n) \right|.$$

It is clear that the UE j of high speed (i.e. with a larger Δ) should be assigned with block spreading code $c_j(n)$ with a smaller $\bar{I}_{j \to i}$, to minimize its inter-user interference to UE i.

Uplink ACK/NAK Transmission Schemes

With the ACK/NAK transmission scheme shown in FIG. 5, three block spreading codes may be assumed, denoted as $c_1$=[1 1 1 1]; $c_2$=[1 −1 −1 1]; and $c_3$=[1 1 −1 −1], are used to cover the four ACK/NAK bearing OFDM symbols. It is straight forward to verify that $\bar{I}_{1 \to 2} = \bar{I}_{1 \to 2} = 0$; $\bar{I}_{1 \to 3} = \bar{I}_{3 \to 1} = 10$; and $\bar{I}_{2 \to 3} = \bar{I}_{3 \to 2} = 2$. Thus, $c_2$ is most suitable for high speed UE, because $\bar{I}_{2 \to 1} = 0$ and $\bar{I}_{2 \to 3} = 2$. Further, $c_1$ and $c_3$ cannot be used to multiplex UEs on the same cyclic shift, unless both are assigned to low speed UEs. With the above observations, the following options may be used to accommodate UL ACK/NAK transmission with high speed UEs.

Option 1: Always assign high speed UE with block spreading code $c_2$. This scheme supports 18 UEs per slot per FIG. 5, among which, at most 6 UEs can be of high speed. In other words, 1 high speed UE can be supported per cyclic shift with block spreading code $c_2$. The rest 12 UEs can only be of low speed. With this option, it may be required to explicitly inform the high speed UEs which block spreading code and cyclic shift to use for the transmission of ACK/NAK, which amounts to additional signaling overhead.

Option 2: Only use $c_1$ and $c_2$ as block spreading codes per cyclic shift for UL ACK/NAK transmission. Thus, the multiplexing capacity of this option reduces to 12 UEs per slot, per FIG. 5. Since the inter-user interference between $C_1$ and $C_2$ are minimal, the advantages of this scheme are 1) any of the 12 UEs can be of high speed; and 2) each UE can implicitly obtain its assigned UL ACK/NAK resources, for example, from the control channel element index in the UL grant transmitted in DL control channel (i.e. PDCCH in 3GPP LTE).

Option 3: All three block spreading codes can be assigned to any UEs of any speeds. This option has the same multiplexing capacity as Option 1, i.e. 18 UEs per slot. It also shares an advantage with Option 2 on the possible implicit mapping between UL ACK/NAK resources and DL control channel elements indices. However, because there is no explicit control on inter-user inference, the ACK/NAK performance of Option 3 with high speed UEs is generally much worse than the previous two options. Thus, Option 3 is more suitable for cells of low speed UEs.

The three options for UL ACK/NAK transmission with high speed UEs described above are summarized in Table 1. Option 1 always assigns a good code to a high speed UE per cyclic shift; Option 2 reduces the multiplexing capacity by utilizing only two mutually good block spreading codes and any of them can be assigned to high speed UEs; and Option 3 puts no restriction on the block spreading code allocation with respect to UE velocity. Option 3 is not desirable in terms of ACK/NAK BER performance. While Option 1 and Option 2 improve the BER performance significantly compared to Option 3, both of them have disadvantages. For example, Option 1 may need explicit signaling on the UL ACK/NAK resource allocation and it can only support a maximum of 6 high speed UEs, and Option 2 reduces the multiplexing capacity per slot from 18 UEs to 12 UEs.

Overall, either Option 1 or Option 2 for UL ACK/NAK transmission with high speed UEs, provides better ACK/NAK detection reliability. Option 3 is desirable for cells of low speed UEs, for its high multiplexing capacity and implicit ACK/NAK resource allocation. Thus, it is beneficial to dynamically switch among the three options, according to the number of high speed UEs in the cell. For example, if the users in one Node-B are most likely to be high speed users, than option 2 is adopted. If most users are of low speed, then option 3 is adopted. Or if some of users are of high speed, then option 1 is adopted. In a dynamic ACK/NAK transmission scheme, a Node-B can inform its users which option to use by broadcasting its choice, e.g. through the broadcast channel.

TABLE 2

Summary of UL ACK/NAK Transmission Schemes with High Speed UEs

|  | Multiplexing Capacity per Slot | Max Num of High Speed UEs | ACK/NAK Performance | Implicit Mapping |
| --- | --- | --- | --- | --- |
| Option 1 | 18 | 6 | Good | Probably No |
| Option 2 | 12 | 12 | Good | Yes |
| Option 3 | 18 | 18 | Poor | Yes |

For the above discussion per FIG. 5, $c_1$=[1 1 1 1]; $c_2$=[1 −1 −1 1]; and $c_3$=[1 1 −1 −1] are the exemplary set of orthogonal block spreading code of length 4. It is straightforward to extend to the cases where other sets of block spreading codes are used. For example, C1=[1 1 1 1], C2=[1 −1 1 −1], and C3=[1 −1 −1 1].

Moreover, it is preferable to multiplex UEs on the same cyclic shift with block spreading codes with minimal inter-user interference. For example, either block spreading code set {[1 1 1 1], [1 −1 −1 1]} or {[1 1 −1 −1], [1 −1 1 −1]} can be used to multiplex two UEs on the same cyclic shift, irrespective the UE velocities. The assignment of block spreading codes to UEs can be random, or based on an implicit mapping as a function of the DL control channel element index in the corresponding UE's UL grant.

In addition, the restricted subset of orthogonal sequence can be fixed. For example, Table 3 shows a restricted subset of orthogonal sequence of length 4, consisting 3 orthogonal sequences.

TABLE 3

An example of restricted subset of orthogonal sequences

| Sequence index | Orthogonal sequences |
| --- | --- |
| 0 | [+1 +1 +1 +1] |
| 1 | [+1 −1 +1 −1] |
| 2 | [+1 −1 −1 +1] |

The orthogonal sequences in Table 3 can be used for the transmission of ACK/NAK and SRI, applied to the ACK/NAK and SRI data OFDM symbols as in 3GPP LTE with normal CP structure. NodeB indicates an orthogonal sequence to a UE, by transmitting its corresponding UL grant on a control channel with index L. UE implicitly derives the orthogonal sequence index from the control channel elements with index L.

Moreover, UE implicitly derives a second sequence to be transmitted in each OFDM symbol. The second sequence refers to a cyclically shifted or phase ramped CAZAC-like sequence, as described before in this disclosure. The second sequence is multiplied by the data (e.g. ACK/NAK, SRI, RI) symbol, as well as an element of the orthogonal sequence, before transmission. UE implicitly derives the second sequence from the control channel element with index L, on which it receives its UL grant.

Table 4 shows another example of restricted subset of orthogonal sequences of length 4, consisting 2 orthogonal sequences. The orthogonal sequences in Table 4 can be used for transmission of ACK/NAK and SRI, applied to ACK/NAK and SRI data OFDM symbols as in 3GPP LTE with extended CP structure.

TABLE 4

Example of restricted subset of orthogonal sequences

| Sequence index | Orthogonal sequences |
| --- | --- |
| 0 | [+1 +1 +1 +1] |
| 1 | [+1 −1 −1 +1] |

Figure 6:
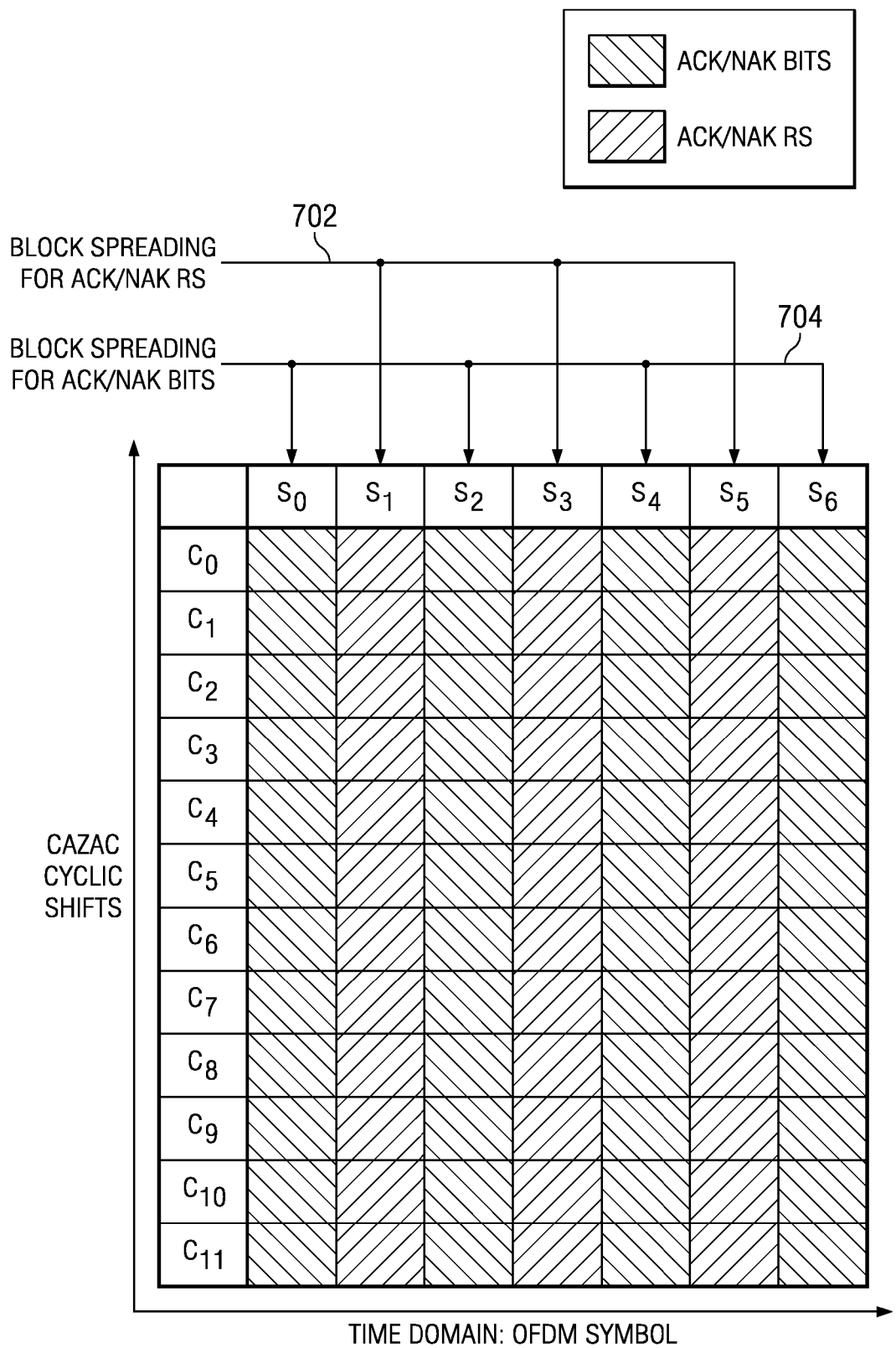
FIGS. 6-7 illustrate alternative embodiments of coherent orthogonal structures which embody block spreading codes according to an embodiment of the present invention.
Figure 7:
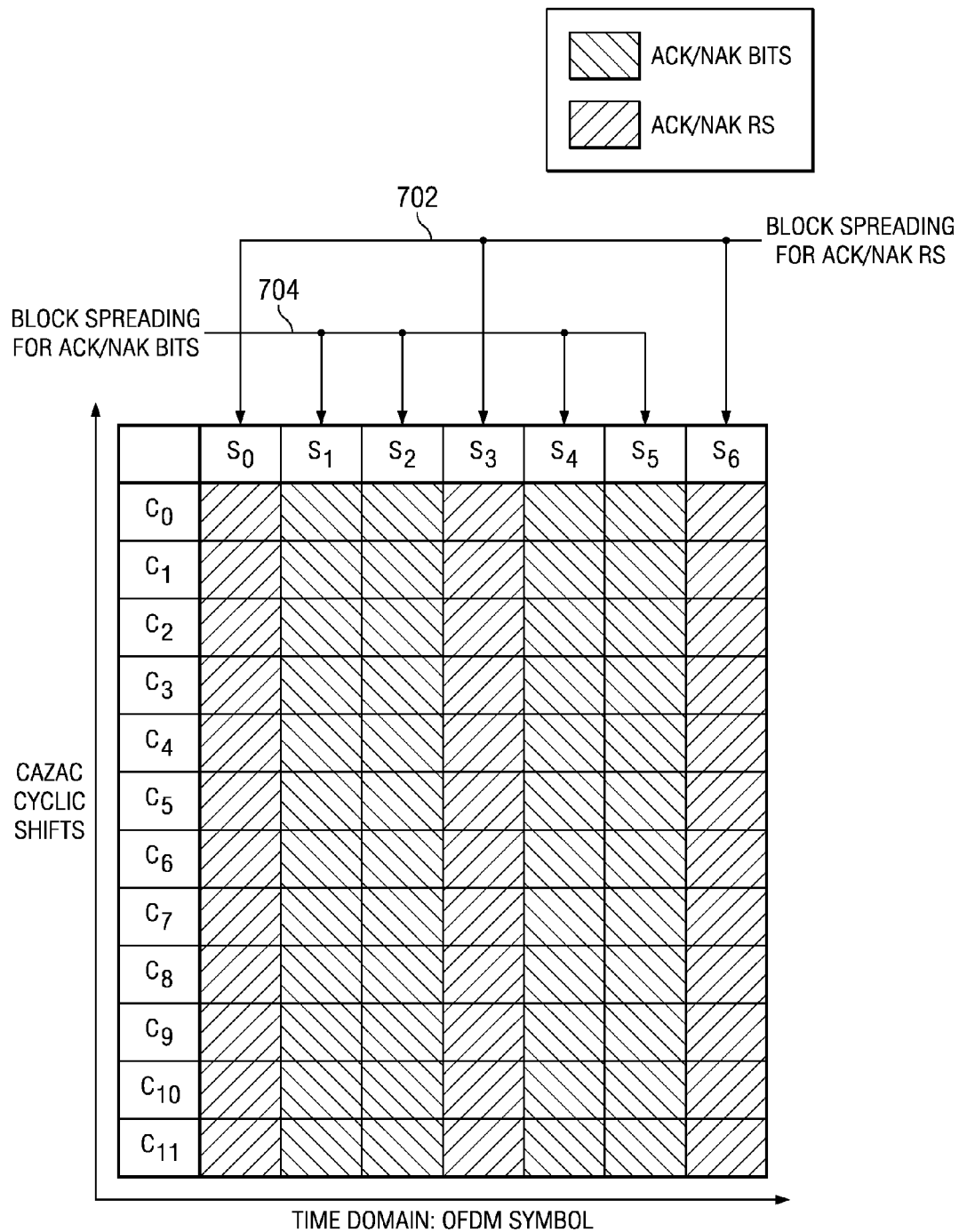

FIGS. 6-7 illustrate alternative embodiments of coherent orthogonal structures which embody block spreading codes according to an embodiment of the present invention. FIGS. 6-7 illustrate a transmission slot in which there are seven OFDM symbols (or time slots) in the time domain. Three OFDM symbols will be used for reference signal (RS) transmission, to enable coherent demodulation. Four OFDM symbols will be used for ACK/NAK bit transmission. A block spreading length 702 of three is applied to the three RS OFDM symbols, while a block spreading of length 704 of four is applied to the four ACK/NAK OFDM symbols. FIG. 6 shows an example where the three RS OFDM symbols are located in the $2^{nd}$, $4^{th}$, and $6^{th}$ OFDM symbol. Alternatively, the three RS OFDM symbols can be located in the $3^{rd}$, $4^{th}$, and $5^{th}$ OFDM symbol as illustrated in FIG. 5, or in the $1^{st}$, $4^{th}$, and $7^{th}$ OFDM symbol, as shown in FIG. 7, respectively.

Figure 8:
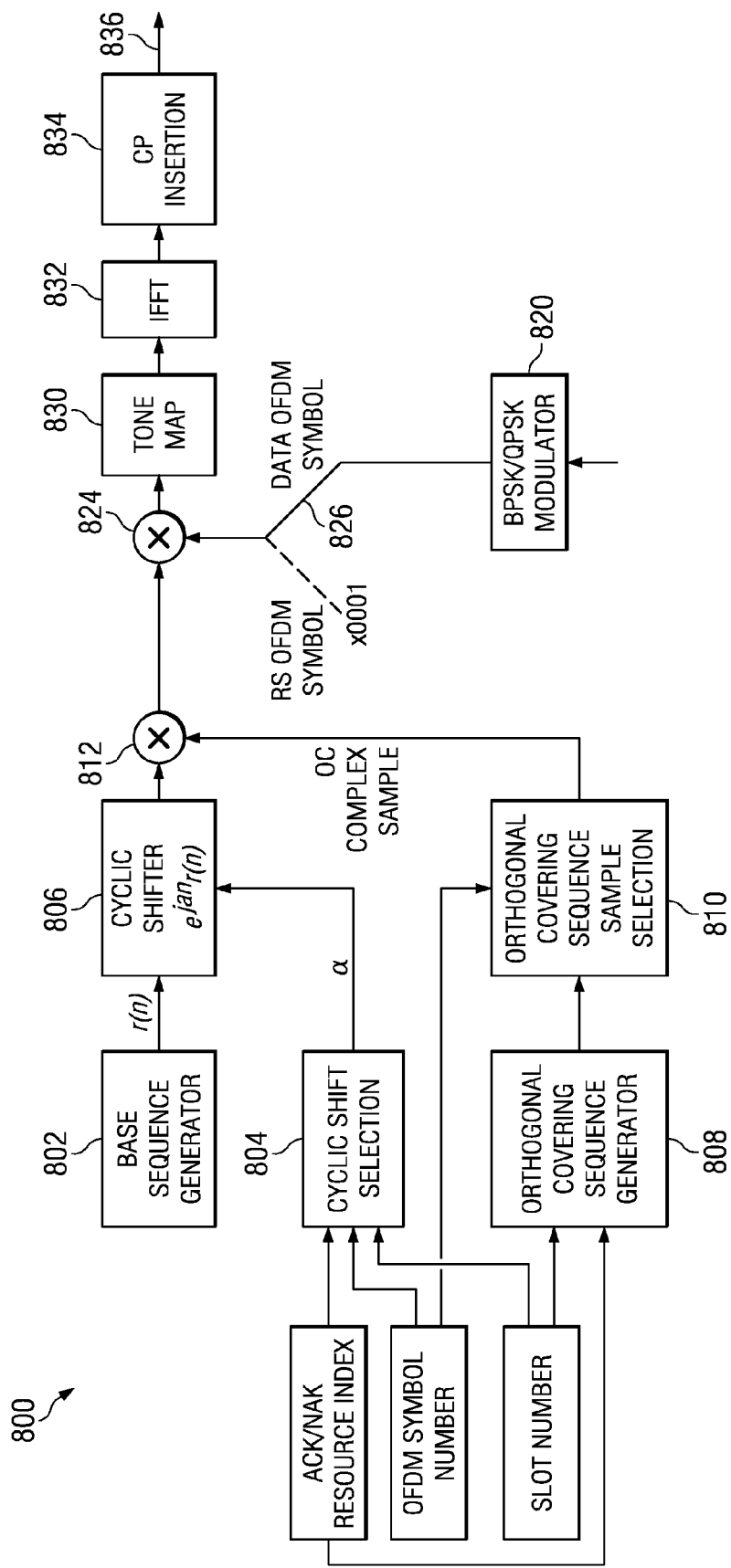
FIG. 8 is a block diagram of an illustrative transmitter for transmitting the coherent ACKNAK structures of FIGS. 2A-2B.

FIG. 8 is a block diagram of an illustrative transmitter 800 for transmitting the coherent structures of FIGS. 2A-2B, 5, 6 and 7. Elements of the transmitter may be implemented as components in a fixed or programmable processor by executing instructions stored in memory. The UE generates a CAZAC-like (e.g. ZC or extended ZC or zero-autocorrelation QPSK computer-generated) sequence using base sequence generator 802. A cyclic shift value is selected for each symbol based on the ACK/NAK resource index (in the ACK/NAK multiplex), the OFDM symbol number and the slot number in cyclic shift selecting module 804. The base sequence is then shifted by cyclic shifter 806 on a symbol by symbol basis using shift values provided by cyclic shift selection module 804.

The UE generates both RS and data orthogonal covering sequences 217 and 218, for example, using orthogonal sequence generator 808. The sequence length is equal to the number of covered OFDM symbols. The number of data OFDM symbols is four in both FIGS. 2A and 2B examples. Sequences used for this orthogonal covering are typically length-4 Walsh-Hadamard sequences, taken from the following set of sequences: {(1,1,1,1), (1,1,−1,−1), (1,−,−,1,1), (1,−1,1,−1)}. The number of RS OFDM symbols is three in FIG. 2A and two in FIG. 2B examples. Sequences used for this orthogonal covering are either length-2 Walsh-Hadamard sequences, taken from the following set of sequences: {(1,1), (1,−1)} or length-3 DFT sequences taken from the following set of sequences: {(1,1,1), (1,$e^{j2pi/3}$, $e^{j4pi/3}$), (1, $e^{j4pi/3}$, $e^{j8pi/3}$)}. Orthogonal sequence generator 808 generates one sequence out of the set of orthogonal sequences based on the ACK/NAK resource index (in the ACK/NAK multiplex). As described above, in a cell having high velocity UE, the sequences are selected and assigned to each UE in a manner that high velocity UE will be assigned covering sequences having lower interference estimates. In case the set of block spreading codes are equally good for high speed UEs, the block spreading codes can be randomly assigned to a UE, or based on an implicit mapping as a function of the DL control channel element index in the corresponding UE's UL grant.

The orthogonal covering sequence sample selection 810 selects and issues the appropriate sequence complex sample from the appropriate sequence (RS or data) based on the index of the OFDM symbol being currently generated.

The cyclic shifted base sequence vector is element-wise complex-multiplied by the selected orthogonal covering complex sample in complex multiplier 812.

The data is organized as either one or two bits in this embodiment and is input to modulator block 820. The data bearing OFDM symbols are binary phase shift key (BPSK) or quadrature phase shift key (QPSK) modulated when the data information is one or two bits wide, respectively. The switch 826 selects, based on the OFDM symbol type (data or RS), which of the modulation complex sample or "1" feeds the complex multiplier 824.

The result of the element-wise complex multiplication is mapped onto a designated set of tones (sub-carriers) using the Tone Map 830. The UE next performs IFFT of the mapped signal using the IFFT 832. A cyclic prefix is created and added in module 834 to form a final fully formed uplink signal 836.

Figure 9:
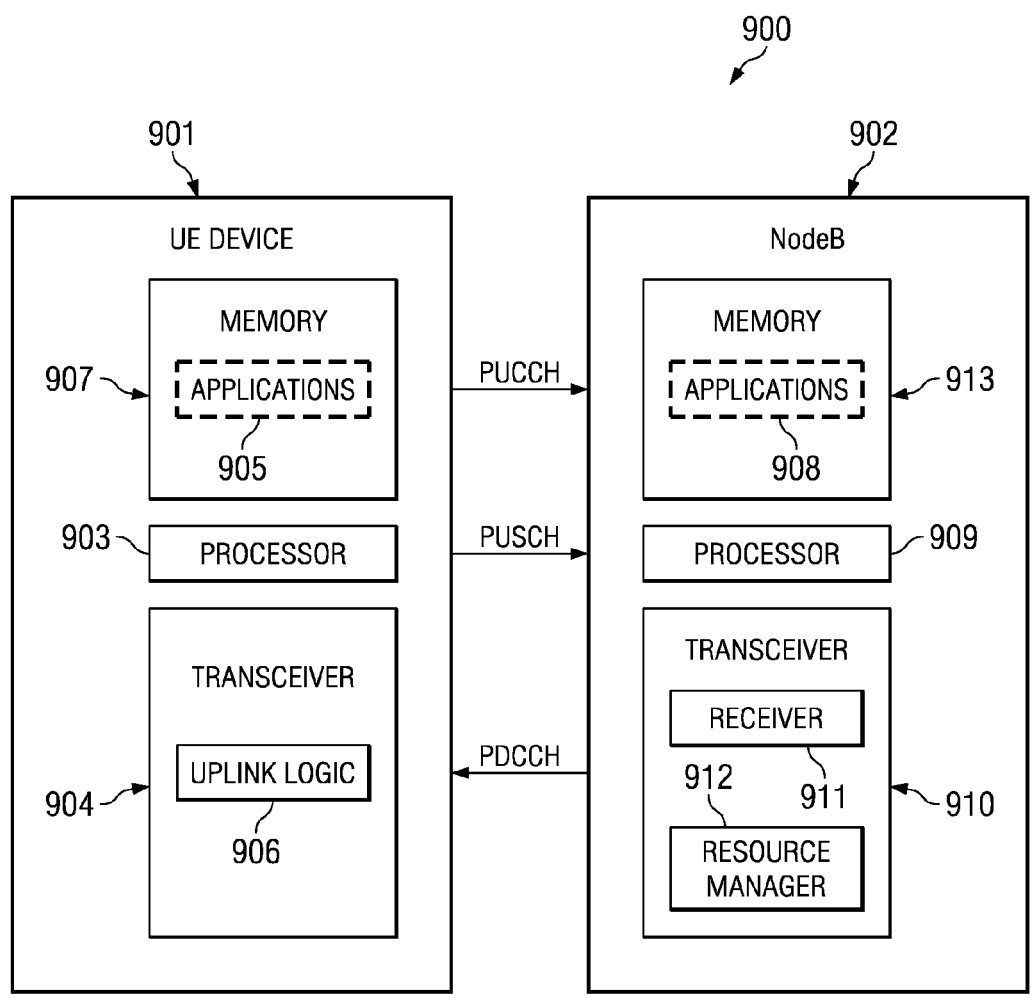
FIG. 9 is a block diagram of a Node B and a User Equipment for use in the network system of FIG. 1.

FIG. 9 is a block diagram illustrating operation of an eNB and a mobile UE in the network system of FIG. 1. As shown in FIG. 9, wireless networking system 900 comprises a mobile UE device 901 in communication with an eNB 902.

The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LTE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VoIP) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904. In at least some embodiments, the mobile UE device 901 identifies a Quality of Service (QoS) requirement when requesting an uplink resource from the eNB 902. In some cases, the QoS requirement may be implicitly derived by the eNB 902 from the type of traffic supported by the mobile UE device 901. As an example, VoIP and gaming applications often involve low-latency uplink (UL) transmissions while High Throughput (HTP)/Hypertext Transmission Protocol (HTTP) traffic can involve high-latency uplink transmissions.

As shown in FIG. 9, the transceiver 904 comprises uplink logic 906. The uplink logic executes instructions that control the operation of the transceiver. Some of these instructions may be stored in memory 907 and executed when needed. As would be understood by one of skill in the art, the components of the Uplink Logic 906 may involve the physical (PHY) layer and/or the Media Access Control (MAC) layer of the transceiver 904. Transceiver 904 includes one or more receivers and one or more transmitters. The transmitter(s) may be embodied as described with respect to FIG. 8. In particular, as described above, in a cell having high velocity UE, the orthogonal covering sequences used by the transmitter for ACK/NAK transmissions are selected and assigned to each UE in a manner that high velocity UE will be assigned covering sequences having lower interference estimates. In case the set of block spreading codes are equally good for high speed UEs, the block spreading codes can be randomly assigned to a UE, or based on an implicit mapping as a function of the DL control channel element index in the corresponding UE's UL grant. In some embodiments, other types of transmissions by the UE may also use the covering sequence selection method as described herein.

As shown in FIG. 9, the eNB 902 comprises a Processor 909 coupled to a memory 913 and a transceiver 910. The memory 913 stores applications 908 for execution by the processor 909. The applications 908 could comprise any known or future application useful for managing wireless communications. At least some of the applications 908 may direct the base-station to manage transmissions to or from the user device 901.

Transceiver 910 comprises an uplink Resource Manager 912, which enables the eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and broadcasts control information via the physical downlink control channel PDCCH. In particular, eNB 902 assigns orthogonal covering sequences to UE in accordance with estimated velocity of a UE and the estimated interference metric for a covering sequence, as described in detail above. For example, if the users in one Node-B are most likely to be high speed users, than option 2 is adopted. If most users are of low speed, then option 3 is adopted. Or if some of users are of high speed, then option 1 is adopted. In case the set of block spreading codes are equally good for high speed UEs, the block spreading codes can be randomly assigned to a UE, or based on an implicit mapping as a function of the DL control channel element index in the corresponding UE's UL grant.

Figure 10:
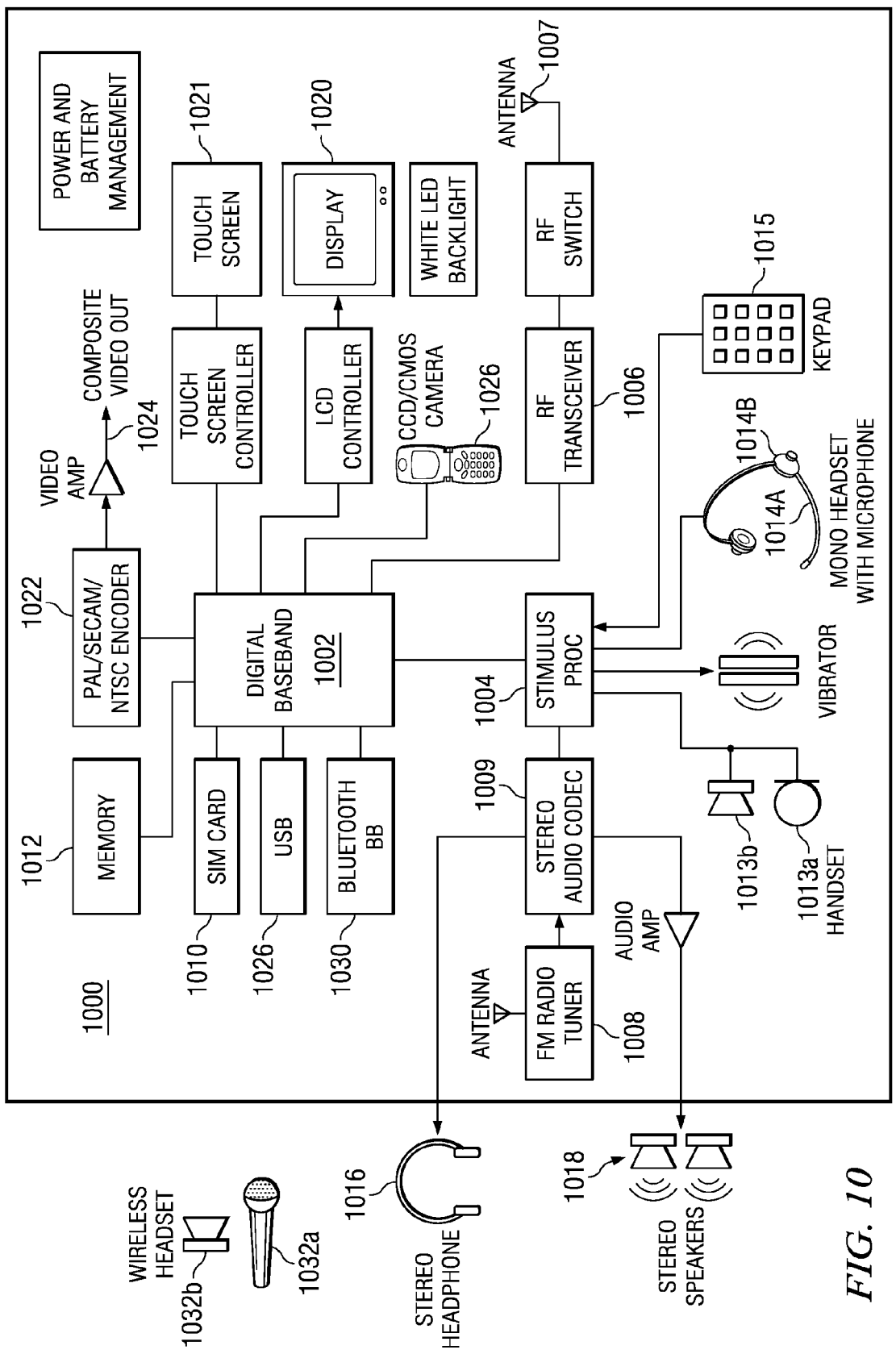
FIG. 10 is a block diagram of a cellular phone for use in the network of FIG. 1.

FIG. 10 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For ACK/NAK transmission, a transmitter(s) within transceiver 1006 may be embodied as described with respect to FIG. 8. In particular, as described above, in a cell having high velocity UE, the orthogonal covering sequences used by the transmitter for ACK/NAK transmissions are selected and assigned to each UE in a manner that high velocity UE will be assigned covering sequences having lower interference estimates. In case the set of block spreading codes are equally good for high speed UEs, the block spreading codes can be randomly assigned to a UE, or based on an implicit mapping as a function of the DL control channel element index in the corresponding UE's UL grant. In some embodiments, other types of transmissions by the UE may also use the covering sequence selection method as described herein.

In 3GPP LTE UL, a similar structure is defined for the transmission of scheduling request indicator (SRI), as for ACK/NAK. The different between the transmission of ACK/NAK and SRI is that ACK/NAK is BPSK/QPSK modulated, depending on the number of ACK/NAK bits, while SRI is ON-OFF keying modulated. The described block spreading code allocation can be equally applied to the transmission of SRI.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot. Block spreading codes can be assigned as described herein for transmission of data and control information, including but not limited to ACK/NAK and SRI.

In another embodiment, the serving eNB may revise assignment(s) of block spreading code(s) to a given UE in response to changes in velocity of the UE, on a periodic basis or an event triggered basis.

It is therefore contemplated that the appended claims will cover any such modifications of the embodiments as fall within the true scope and spirit of the invention.

What is claimed is:

1. A method for operating a wireless communication system, comprising:
    sending an indication of a first sequence from a primary node to at least one secondary node, wherein the first sequence is of length N, and wherein the first sequence is selected from a restricted set comprising of M sequences of length N each, wherein M<N;
    sending an indication of a second sequence from the primary node to the secondary node, wherein the secondary sequence comprises at least two samples; and
    receiving a transmission signal produced by the secondary node, wherein transmission signal comprises a plurality of logical time durations, wherein a K-th logical time duration of the transmission signal is generated by operating on the entire second sequence with the K-th element of the first sequence.

2. The method of claim 1 wherein an element-wise product of at least one pair of sequences from the restricted set results in a mirror-symmetric sequence.

3. The method of claim 1, wherein each logical time duration constitutes an OFDM symbol.

4. The method of claim 1, wherein sending an indication of a first sequence comprises:
    transmitting from the first node to a secondary node using a channel element with index L; and
    deriving the first sequence at the secondary node using L.

5. The method of claim 4, wherein the channel element with index L carries control information.

6. The method of claim 1 wherein N logical time durations are not all consecutive.

7. The method of claim 1 wherein the restricted set is fixed.

8. The method of claim 2, wherein the restricted set comprises M orthogonal sequences.

9. The method of claim 8 wherein the restricted set consists of three sequences: [1 1 1 1], [1 −1 1 −1], and [1 −1 −1 1].

10. The method of claim 8 wherein the restricted set consists of two sequences: [1 1 1 1], and [1 −1 −1 1].

11. The method of claim 1, wherein the transmission signal of the secondary node comprises a 0.5 ms slot, wherein a first half of logical time durations are present at the beginning of the slot, wherein a second half of logical time durations are present at the end of the slot, and wherein reference signals are present in the middle of the slot.

12. The method of claim 11, wherein the restricted set consists of three sequences: [1 1 1 1], [1 −1 1 −1], and [1 −1 −1 1].

13. The method of claim 11, wherein the restricted set consists of two sequences [1 1 1 1], and [1 −1 −1 1].

14. The method of claim 12, wherein an element of uplink control information (UCI) is used to produce the transmission signal at the secondary node.

15. The method of claim 14, wherein the element of UCI is selected from the set consisting of: ACKNAK information, scheduling request indicator (SRI), and rank indicator (RI).

16. The method of claim 13, wherein an element of uplink control information (UCI) is used to produce the transmission signal at the secondary node.

17. The method of claim 16, wherein the element of UCI is selected from the set consisting of: ACKNAK information, scheduling request indicator (SRI), and rank indicator (RI).

18. The method of claim 1, further comprising
evaluating inter-sequence interference in the restricted set;
evaluating velocity for each secondary node;
ranking the sequences in the restricted set according to the evaluated interference;
ranking the secondary nodes according to evaluated velocities; and
assigning the first sequence with lowest interference to the secondary node with highest velocity.

19. The method of claim 18, further comprising:
evaluating interference $I_j$ of a first sequence $C_j=[c_{j,1}, c_{j,2}, \ldots, c_{j,N}]$ in the restricted set according to $$I_j = \max_{1 \leq i \leq M, i \neq j} \left| \sum_{n=1}^{N} c_{i,n}^* c_{j,n} w_n \right|,$$

wherein $w_n$ is a weighting vector of length N.

20. A base station for use in a cellular network, comprising:
means for sending an indication of a first sequence to at least one user equipment (UE) served by the base station, wherein the first sequence is of length N, and where the first sequence is selected from a restricted set comprising of M sequences of length N each, wherein M<N; and
means for sending an indication of a second sequence to the UE, wherein the secondary sequence comprises at least two samples.

21. The base station of claim 20, further comprising means for receiving a transmission signal produced by the UE, wherein the transmission signal comprises a plurality of logical time durations, wherein a K-th logical time duration of the transmission signal is generated by operating on the entire second sequence with the K-th element of the first sequence.

22. The base station of claim 21 wherein an element-wise product of at least one pair of sequences from the restricted set results in a mirror symmetric sequence.

23. The base station of claim 21, wherein each logical time duration constitutes an OFDM symbol.

24. The base station of claim 21, wherein sending an indication of a first sequence comprises:
transmitting from the base station to a UE using a channel element with index L; and
deriving the first sequence at the UE using L.

25. The base station of claim 24, wherein the channel element with index L carries control information.

26. The base station of claim 21 wherein N logical time durations are not all consecutive.

27. The base station of claim 22, wherein the restricted set comprises M orthogonal sequences.

28. The base station of claim 27 wherein the restricted set consists of three sequences: [1 1 1 1], [1 −1 1 −1], and [1 −1 −1 1].

29. The base station of claim 27 wherein the restricted set consists of two sequences: [1 1 1 1], and [1 −1 −1 1].

30. The base station of claim 21 wherein the restricted set is fixed.

31. The base station of claim 21, wherein the transmission signal of the UE comprises a 0.5 ms slot, wherein a first half of logical time durations are present at the beginning of the slot, wherein a second half of logical time durations are present at the end of the slot, and wherein reference signals are present in the middle of the slot.

32. The base station of claim 31, wherein the restricted set consists of three sequences: [1 1 1 1], [1 −1 1 −1], and [1 −1 −1 1].

33. The base station of claim 31, wherein the restricted set consists of two sequences [1 1 1 1], and [1 −1 −1 1].

34. The base station of claim 32, wherein an element of uplink control information (UCI) is used to produce the transmission signal at the UE.

35. The base station of claim 34, wherein the element of UCI is selected from the set consisting of: ACKNAK information, scheduling request indicator (SRI), and rank indicator (RI).

36. The base station of claim 33, wherein an element of uplink control information (UCI) is used to produce the transmission signal at the UE.

37. The base station of claim 36, wherein the element of UCI is selected from the set consisting of: ACKNAK information, scheduling request indicator (SRI), and rank indicator (RI).

38. The base station of claim 21, further comprising means for evaluating inter-sequence interference in the restricted set;
means for evaluating velocity of a plurality of UE served by the base station;
means for ranking the sequences in the restricted set according to the evaluated interference;
means for ranking the plurality of UE according to evaluated velocities; and
means for assigning the first sequence with lowest interference to the UE with highest velocity.

39. The base station of claim 38, further comprising:
means for evaluating interference $I_j$ of a first sequence $C_j=[c_{j,1}, c_{j,2}, \ldots c_{j,N}]$ in the restricted set according to $$I_j = \max_{1 \leq i \leq M, i \neq j} \left| \sum_{n=1}^{N} c_{i,n}^* c_{j,n} w_n \right|,$$

wherein $w_n$ is a weighting vector of length N.

40. A method for transmission in a wireless communication system, comprising:
receiving an indication of a first sequence from a primary node at a user equipment (UE), wherein the first sequence is of length N, and wherein the first sequence is selected from a restricted set comprising M sequences of length N each, wherein M<N;
producing a second sequence at the UE; and
forming a transmission signal by the UE, wherein the transmission signal comprises a plurality of logical time durations, wherein a K-th logical time duration of the transmission signal is generated by operating on the entire second sequence with the K-th element of the first sequence.

41. The method of claim 40 wherein an element-wise product of at least one pair of sequences from the restricted set results in a mirror-symmetric sequence.

42. The method of claim 40, wherein each logical time duration constitutes an OFDM symbol.

43. The method of claim 40, wherein receiving an indication of a first sequence comprises:
receiving a transmission from the primary node using a channel element with index L; and
deriving the first sequence at the UE using L.

44. The method of claim 43, wherein the channel element with index L carries control information.

45. The method of claim 40 wherein N logical time durations are not all consecutive.

46. The method of claim 40 wherein the restricted set is fixed.

47. The method of claim 41, wherein the restricted set comprises M orthogonal sequences.

48. The method of claim 47 wherein the restricted set consists of two sequences: [1 1 1 1], and [1 −1 −1 1].

49. The method of claim 47 wherein the restricted set consists of three sequences: [1 1 1 1], [1 −1 1 −1], and [1 −1 −1 1].

50. The method of claim 40, wherein the transmission signal of the UE comprises a 0.5 ms slot, wherein a first half of logical time durations are present at the beginning of the slot, wherein a second half of logical time durations are present at the end of the slot, and wherein reference signals are present in the middle of the slot.

51. The method of claim 50, wherein the restricted set consists of three sequences: [1 1 1 1], [1 −1 1 −1], and [1 −1 −1 1].

52. The method of claim 50, wherein the restricted set consists of two sequences [1 1 1 1], and [1 −1 −1 1].

53. The method of claim 51, wherein an element of uplink control information (UCI) is used to produce the transmission signal at the UE.

54. The method of claim 53, wherein the element of UCI is selected from the set consisting of: ACKNAK information, scheduling request indicator (SRI), and rank indicator (RI).

55. The method of claim 52, wherein an element of uplink control information (UCI) is used to produce the transmission signal at the UE.

56. The method of claim 55, wherein the element of UCI is selected from the set consisting of: ACKNAK information, scheduling request indicator (SRI), and rank indicator (RI).

57. A UE apparatus for use in a cellular network, comprising:
   means for producing a first sequence; wherein the first sequence is selected from a restricted set comprising of M sequences of length N each, wherein M<N;
   means for producing a second sequence; and
   means for using the entire second sequence and the K-th element of the first sequence to generate a transmission signal for the K-th logical time duration.

58. The apparatus of claim 57, wherein means for producing the first sequence comprises an apparatus for receiving a transmission on a channel element with index L, and wherein L indicates the first sequence.

59. The apparatus of claim 58 for use in an OFDMA network, further comprising an apparatus for multi-carrier modulation.

60. The apparatus of claim 57 further comprising:
   an apparatus for generating an element of UCI; and
   means for generating a transmission signal for K-th logical time duration using the element of UCI.

* * * * *